G. Hall,
Hand Seeder.
No. 94,105. Patented Aug 24, 1869.

Witnesses
Harry King
C. L. Ebert

Inventor
Geo. Hall
per
Alexander Mason
Attys

United States Patent Office.

GEORGE HALL, OF MORGANTOWN, WEST VIRGINIA.

Letters Patent No. 94,105, dated August 24, 1869.

IMPROVEMENT IN HAND SEED-SOWER.

The Schedule referred to in these Letters Patent and making part of the same.

*To all whom it may concern:*

Be it known that I, GEORGE HALL, of Morgantown, in the county of Monongalia, and in the State of West Virginia, have invented certain new and useful Improvements in Hand Seed-Sowers; and do hereby declare that the following is a full, clear, and exact description thereof, reference being had to the accompanying drawings, and to the letters of reference marked thereon, making a part of this specification.

The nature of my invention consists in the construction and general arrangement of a hand seed-sower, but more particularly in the construction of the rod or bar, by means of which the seed is agitated and distributed.

In order to enable others skilled in the art to which my invention appertains, to make and use the same, I will now proceed to describe its construction and operation, referring to the annexed drawings, in which—

Figure 1:
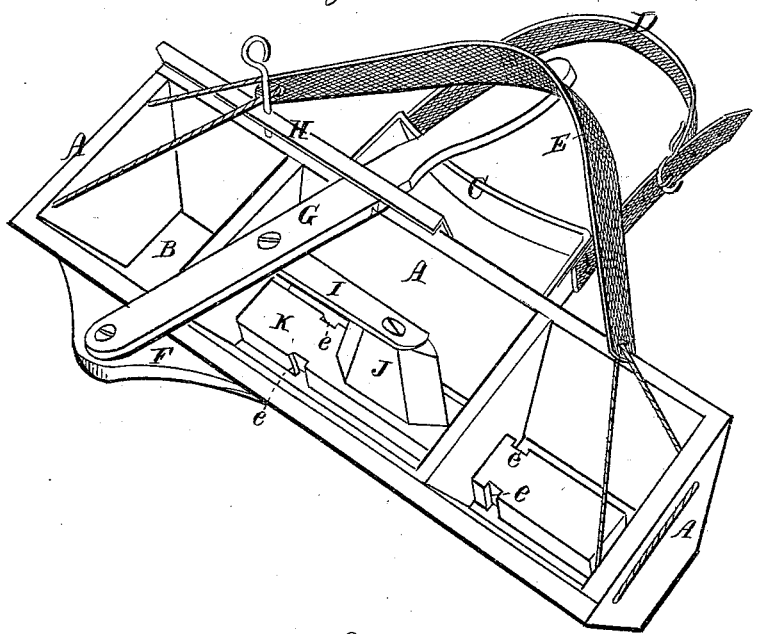
Figure 1 is a perspective view of my seed-sower complete.
Figure 2:
Figure 2 is a longitudinal vertical section of a portion of the distributing-rod or bar, and a portion of the bottom of the seed-box.
Figure 3:
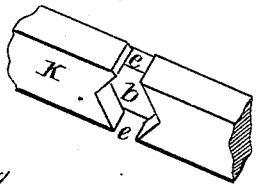
Figure 3 is a perspective view, showing the under side of the distributing-rod or bar.

A represents the seed-box, of suitable dimensions, and its bottom, B, provided with suitable apertures, *a a*, through which the seed is distributed.

On the rear side of the box A is placed a bent bar, C, to which is attached a strap, D, which is fastened around the waist of the operator.

Another strap, E, the ends of which are connected with the ends of the box A, is passed around the neck of the operator, thus supporting the whole seed-sower.

On the front side of the box A is a projection, F, to which the front end of a lever, G, is pivoted, said lever passing backward under a metal guide, H, secured on the upper rear edge of the box.

The rear end of the lever G serves as a handle, with which the machine is operated.

To the lever G, at a suitable point, is pivoted one end of a bar, I, the other end of which is pivoted to a standard, J, on the distributing-rod or bar K, which rests on the bottom B, and is guided by suitable guides or partitions in the box, so as to be moved easily back and forth from end to end of the box, by the operation of the handle G.

The under side of the rod or bar K is, at a suitable distance from each end, provided with a diamond-shaped recess, *b*, and along the sides are vertical grooves, *e e*, leading into said recesses, for the purpose of agitating the seed, and distributing the seed evenly through the openings *a a* in the bottom B.

Having thus fully described my invention,

What I claim as new, and desire to secure by Letters Patent, is—

1. The distributing-rod or bar K, provided with diamond-shaped recesses, *b b*, and vertical grooves *e e*, substantially as and for the purposes herein set forth.

2. In combination with the distributing-rod or bar K, having the recesses *b b* and notches *e e*, the seed-box A, having perforated bottom B, and a suitable device for operating the rod, substantially as and for the purposes herein set forth.

In testimony that I claim the foregoing, I have hereunto set my hand, this 7th day of June, 1869.

GEORGE HALL.

Witnesses:
 DAVID H. CHADWICK,
 I. C. CHADWICK.